United States Patent
Labeau et al.

(10) Patent No.: US 8,613,318 B2
(45) Date of Patent: Dec. 24, 2013

(54) FLOODING FLUID AND ENHANCING OIL RECOVERY METHOD

(75) Inventors: Marie-Pierre Labeau, Burlington, NJ (US); Guillaume Degre, Talence (FR); Rajesh Ranjan, Langhorne, PA (US); Isabelle Henaut, Rueil Malmaison (FR); René Tabary, Saint-Germain-en-Laye (FR); Jean-François Argillier, Rueil Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 534 days.

(21) Appl. No.: 12/939,310

(22) Filed: Nov. 4, 2010

(65) Prior Publication Data
US 2011/0100631 A1    May 5, 2011

Related U.S. Application Data

(60) Provisional application No. 61/258,342, filed on Nov. 5, 2009.

(51) Int. Cl.
*E21B 43/22* (2006.01)
*E21B 43/26* (2006.01)
*C09K 8/588* (2006.01)

(52) U.S. Cl.
USPC ........... 166/275; 166/271; 507/211; 507/217; 507/254; 507/255; 536/122

(58) Field of Classification Search
None
See application file for complete search history.

(56) References Cited

U.S. PATENT DOCUMENTS

| | | | | |
|---|---|---|---|---|
| 3,046,272 | A * | 7/1962 | Strating et al. | 536/109 |
| 3,467,647 | A * | 9/1969 | Benninga | 536/114 |
| 4,524,003 | A * | 6/1985 | Borchardt | 507/211 |
| 5,378,830 | A | 1/1995 | Yeh | |
| 8,097,566 | B2 * | 1/2012 | Weaver et al. | 507/219 |
| 2006/0151172 | A1 | 7/2006 | Hanes, Jr. et al. | |
| 2007/0015678 | A1 | 1/2007 | Rodrigues et al. | |
| 2008/0020948 | A1 | 1/2008 | Rodrigues et al. | |
| 2008/0021167 | A1 | 1/2008 | Rodrigues | |
| 2008/0300149 | A1 * | 12/2008 | Reddy et al. | 507/110 |
| 2010/0081586 | A1 * | 4/2010 | Smith et al. | 507/213 |
| 2010/0319922 | A1 * | 12/2010 | Weaver et al. | 166/308.1 |

FOREIGN PATENT DOCUMENTS

WO    WO 2007/058599 A1    5/2007

* cited by examiner

*Primary Examiner* — George Suchfield
(74) *Attorney, Agent, or Firm* — Antonelli, Terry, Stout & Kraus, LLP.

(57) ABSTRACT

The invention relates to an enhancing oil recovery method by injecting into a subterranean oil formation an aqueous flooding fluid comprising at least one injecting galactomannan polymer substituted by at least one sulfonation agent. The invention also relates to an flooding fluid having better injectivity properties than existing flooding fluids.

14 Claims, 6 Drawing Sheets

FLOODING FLUID AND ENHANCING OIL RECOVERY METHOD

CROSS-REFERENCE TO RELATED APPLICATION

This application is a nonprovisional application claiming the benefit of the filing date of U.S. Application Ser. No. 61/258,342, filed Nov. 5, 2009, the contents of which are incorporated herein by reference.

FIELD OF THE INVENTION

This disclosure relates to enhancing oil recovery field. More specifically, it relates to a flooding fluid comprising at least one aqueous injecting galactomannan polymer and to an enhancing oil recovery method using said flooding fluid.

BACKGROUND OF THE INVENTION

The recovery of crude oil from a rock formation usually takes place in several stages. The first phase of production resulting from the natural energy of the oil in place; oil goes freely outside the well because the difference of pressure between the reservoir and atmospheric pressure. This initial recovery, called primary recovery, represents generally about 5 to 20% of the average amount of oil in the rock formation. The secondary and tertiary recovery consists of drilling several wells around the depleted rock formation, at least one injection well where a flooding fluid is injected under pressure and at least one producing well in which oil is recovered. The flooding fluid forms a front of migration that will move toward the oil producing well, because of its non miscibility properties with oil. This technique is called enhanced oil recovery (EOR for Enhancing Oil Recovery) and can generally get 25 to 75% oil. Tertiary recovery differs from the secondary recovery by the nature of injected fluid. In the secondary recovery, aqueous liquid such as brine or fresh water has been injected through a well whereas in the tertiary recovery, additional compounds have been mixed in the injecting aqueous fluid before the injecting and flooding steps.

There are three main techniques for the tertiary recovery. One is based on the injection of a flooding fluid comprising polymers, the other one is based on the injection of a flooding fluid comprising surfactants and in the last one, the flooding fluid comprises a mixture of polymers and surfactants.

Surfactants have been used as additional compounds in order to lower the interfacial surface tension (IFT) of the aqueous fluid and in order to enable the aqueous fluid to form emulsions and/or microemulsions with the oil in the reservoir. The formations of mixtures and/or microemulsions dislodges the entrapped oils in the rock formations through IFT reduction and solubilization of oil in the aqueous surfactant solutions thereby increasing the recovery of oil from subterranean formations. However, the surfactant fluids have less viscosity than the oil, so their effectiveness in pushing the oil from the formations is limited.

Synthetic polymers have been used for increasing the viscosity of the aqueous fluids. These polymers are for example polyacrylamide, polyvinylpyrrolidone or polyvinyl-sulphonate and their derivatives. Natural polymer such as polysaccharides extracted from grains such as the Guar gum or algae such as alginates or carrageenans or from the biopolymers produced by fermentation initiated by bacteria or mushrooms are used for their high viscosifying capacity (HYDROCOLLOIDS, CEH Marketing Research Report, Ray K. Will, October 2007).

However, the addition of natural polysaccharides polymers in an aqueous fluid presents one substantial disadvantage. Natural polysaccharides commonly are poorly injectable due to the presence of residue of synthesis or poorly solvated part of the chain that may impair the permeability of the near wellbore injection zone.

The purpose of this invention is to overcome the drawback of prior art.

It is therefore an object of this invention to provide a new flooding fluid for enhancing oil recovery operations having good injectivity properties.

It is yet a further object of the present invention to have a flooding fluid that adsorbs moderately on the formation.

It is further an object of the invention to provide a new flooding fluid that exhibits high resistance to mechanical degradations.

It is also an object of the present invention to provide a flooding fluid having good thermal stability properties.

SUMMARY

Thus the invention provides an aqueous flooding fluid for enhancing oil recovery method comprising at least one injecting galactomannan polymer substituted by at least one sulfonation agent.

The invention also relates to an enhancing oil recovery method comprising the following steps:
(a) injecting into a subterranean oil formation an aqueous flooding fluid through one or more injection wells,
(b) displacing the aqueous flooding fluid into the formation towards one or more production wells,
(c) recovering the oil from one or more producing wells, said aqueous flooding fluid comprising at least one injecting galactomannan polymer substituted by at least one sulfonation agent.

As used herein, the term "enhanced oil recovery" or "EOR" refers to the process which usually involves the injection of an aqueous fluid or flooding fluid of some type into a subterranean reservoir or formation. The injected fluids and injection processes supplement the natural energy present in the reservoir to displace oil to a producing well. In addition, the injected fluids interact with the reservoir rock and oil system to create favourable conditions for oil recovery displacement.

As used herein, the term "subterranean formation" or "subterranean reservoir" or "subterranean oil formation" refers to a place where the crude hydrocarbons found in reservoirs forms in the Earth's crust. It exists anywhere from 50 m to 10 000 m below the surface and has a variety of shapes, sizes and ages.

As used herein, the term "flooding fluid" or "flooding solution" refers to an aqueous fluid used for enhanced oil recovery in subterranean formation.

As used herein, the term "injecting" refers to a fluid which does not damage the subterranean formation.

One aspect of the present invention relates to a method for recovering oil from a subterranean reservoir or a formation by injecting into the reservoir or formation a flooding fluid comprising at least one injecting galactomannan polymer.

BRIEF DESCRIPTION OF THE DRAWINGS

For a detailed description of the preferred embodiments of the disclosure, reference will now be made to the accompanying drawings in which:

FIG. 1 represents formula of galactomannan polymer.

DESCRIPTION OF THE PREFERRED EMBODIMENTS

In accordance with the present invention, it has been surprisingly found that treating galactomannan polymers with a sulfonation reaction results in a better higher injectivity and higher mechanics resistance properties of these polymers.

Figure 1A:
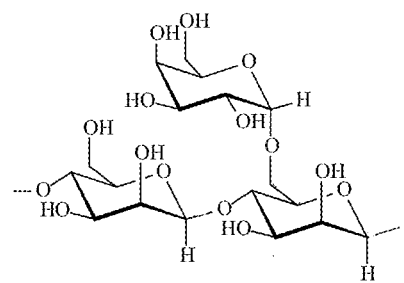
FIG. 1A represents the structure of non derivatized Guar.
Figure 1B:
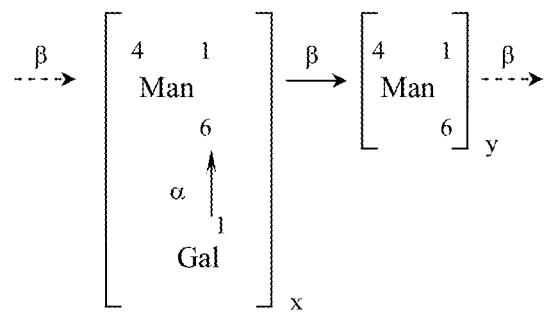
FIG. 1B is a schematic representation of non derivatized galactomannan polymer and FIG. 1C represents the structure of hydroxypropyl Guar (HP Guar).

The galactomannan polymers are polysaccharides composed principally of galactose and mannose units and are usually found in the endosperm of leguminous seeds, such as Guar, locust bean, honey locust, flame tree, and the like or in microbial sources, in particular yeast and fungi. Galactomannan polymers differ from each other by the average mannose/galactose molar ratio (ratio Man/Gal) and by their molecular weights. Guar flour, for example, is composed mostly of a galactomannan which is essentially a straight chain of mannose with single membered galactose branches. The mannose units are linked in a (1→4) beta glycosidic linkage and the galactose branching takes place by means of a (1→6) alpha glycosidic linkage on alternate mannose units. The ratio of galactose to mannose in the Guar polymer is, therefore, equal to two. Guar from the *Cyamopsis tetragonalobus* has a high molecular weight (around 3 million g/mole). The ratio Man/Gal of different galactomannan polymers isolated from various seeds is illustrated in Table 1 (Manjoosha Srivaxtava, V. P. Kapoor. Chemistry & Biodiversity. Vol. 2, 295-317, (2005)). The structure of galactomannan Guar is represented in FIG. 1A and a schematic structure of a galactomannan polymer is illustrated in FIG. 1B.

TABLE 1

List of the principal seed galactomannan polymers.

| Source | Man/Gal | Repeating Unit | |
|---|---|---|---|
| | | x | y |
| *Cyamopsis tetragaonoloba* (Guar) | 2.0 | 1 | 1 |
| *Ceratonia siliqua* (Carob) | 4.0 | 1 | 3 |
| *Sesbania bispinosa* | 1.9 | 10 | 9 |
| *Gleditsia amorphoides* | 2.7 | 10 | 12 |
| *Gleditsia triachanthos* | 0.38-0.67 | 10 | 26 |
| *Cassia nodosa* | 3.5 | 2 | 5 |
| *Cassia occidentalis* | 3.0 | 1 | 2 |
| *Cassia fistula* | 3.0 | 1 | 2 |
| *Cassia grandis* | 3.2 | 10 | 27 |
| *Cassia alata* | 3.3 | 10 | 33 |
| *Cassia didymobotrya* | 3.0 | 1 | 2 |
| *Cassia siamea* | 3.07 | 1 | 2 |
| *Cassia spectabilis* | 2.65 | 10 | 16 |
| *Cassia ovata* | 2.5 | 2 | 3 |
| *Cassia renigera* | 2.6 | 10 | 6 |
| *Crotolaria verrucossa* | 4.0 | 2 | 6 |
| *Delomix regia* | 2.0 | 1 | 1 |

Figure 1C:
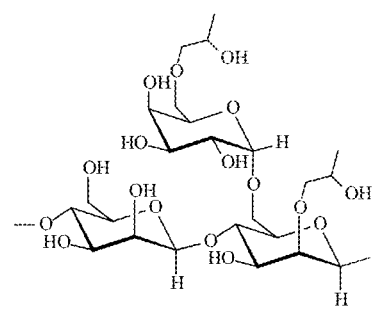

In use, the galactomannan polymers may be either in its natural state (i.e., pure Guar polymer) or may be derivatized. Derivatized galactomannans polymers can be selected from the group consisting of hydroxypropyl Guar (HP Guar), carboxymethyl Guar (CM Guar), carboxymethyl hydroxypropyl Guar (CMHP Guar), hydroxyethyl Guar (HE Guar), carboxymethyl hydroxyethyl Guar (CMHE Guar), hydrophobically-modified Guar (HM Guar), hydrophobically-modified carboxymethyl Guar (HMCM Guar) and hydrophobically-modified hydroxyethyl Guar (HMHE Guar), cationic hydrophobically modified hydroxypropyl Guar (cationic HMHP Guar), hydrophobically modified carboxymethylhydroxypropyl Guar (HMCMHP Guar) and hydrophobically modified cationic Guar (HM cationic Guar). For example, hydroxypropyl Guar is sold by Rhodia Inc. under the trade names Jaguar® 8012, Jaguar® 8060, Jaguar® 8000, Jaguar® HP-20 and Jaguar® HP-23. In a preferred embodiment of the invention, the galactomannan polymer is the hydroxypropyl Guar (FIG. 1C). In another preferred embodiment of the invention, the galactomannan polymer is the hydroxyethyl Guar.

The galactomannan polymers or derivatized galactomannans polymers usually have a molecular weight in the range 100 000 g/mol to 20 000 000 g/mol, and more preferably in the range between 500 000 g/mol to 15 000 000 g/mol, even more preferably in the range 1 000 000 to 10 000 000 g/mol, depending on their possible degree of polymerization. in the present invention, the molecular weight of the galactomannan polymers is determined by Gel Permeation Chromatography (GPC) coupled to a Multi Angle Laser Light Scattering (MALLS) detector. This technique gives absolute weight values based on the known molecular weight of an external calibration standard. The molecular weight of the galactomannan polymer is in fact the weight-average molecular weight obtained by GPC.

The invention is applicable to any galactomannan polymers or galactomannan polymers derivatives. Sulfonation of polysaccharides in general and Guar in particular can be achieved through many ways, all known for the one skilled in the art.

For example, a reaction of galactomannan polymer with sultones can be done as described in US 2006/0151172, herein incorporated by reference. Galactomannan polymers can also be pre-functionalized before reacting with a sulfonation agent. For instance, galactomannan polymers can be pre-functionalized with double bonds using allyl glycidyl ether or allyl bromide. Then, they will react with sodium bisulfite, especially in the presence of amino oxides, yielding sulfonated units. This reaction is described in more detail in WO2007058599, herein incorporated by reference. Another way of pre-functionalization of the galactomannan polymers consists of the derivatization of hydroxyls into aldehyde functions by an oxidative cleavage with periodates for example. This could be also done by an oxidation with TEMPO (2,2,6,6-tetramethylpiperidine-1-oxyl) or analogues. Then, the pre-functionalisated galactomannan polymers react either with sodium bisulfite according to the teaching of US20080300149 or with sodium sulfite according to US20070015678 in order to obtain sulfonation of the galactomannan polymer according to the invention. Another way of the sulfonation of galactomannan consists of grafting a sulfonation agent through radical polymerization or through Michael addition for example. U.S. Pat. No. 5,378,830, US 2008020948 and US 2008021167, all herein incorporated by reference, describe such reactions.

As will be understood by one of ordinary skill in the art, the extent of sulfonation of the galactomannan polymers may be adjusted by varying the reaction conditions (e.g. sulfonation agent, reaction time, reaction temperature).

Any sulfonation agent which contains a sulfonate group can be used to produce sulfonated galactomannan polymer according to the present invention. The sulfonation agent is selected in the group comprising 2-acrylamido-2-methyl propane sulfonic acid (AMPS), sodium vinyl sulfonate (SVS), sodium (meth)allyl sulfonate, sulfonated styrene, (meth)allyloxybenzene sulfonic acid, sodium 1-allyloxy 2 hydroxy propyl sulfonate, sodium chlorohydroxypropanesulfonate (CHPSNa), sodium bisulfate, a cyclic sultone (such as 1,3-propylsultone or 1,4-butylsultone), sodium styrene sulfonate (SSS). In a preferred embodiment, the sulfonation agent is 2-acrylamido-2-methyl propane sulfonic acid or sodium chlorohydroxypropanesulfonate. In another preferred embodiment, the sulfonation agent is sodium vinyl sulfonate (SVS).

By the term "degree of substitution" (DS) as employed herein, is meant the average substitution of sulfonation agent per anhydro sugar unit in the galactomannan polymer. Since each sugar ring contains in average 3 hydroxyl functions in galactomannan polymer, the DS varies between 0 and 3. DS=1 means that, in average, 1 sulfonated group has been grafted per sugar ring while 2 out of the 3 initial hydroxyl groups are still intact. DS=3 means that in average 3 sulfonated groups have been grafted per sugar ring, i.e. there is no intact hydroxyl left.

In accordance with the present invention, there is provided a galactomannan polymer having a degree of substitution (DS) values comprised in the range of 0.2 to 3. In a preferred embodiment, DS values are comprised in the range of 0.25 to 2.5, more preferably to 0.5 to 2.2.

According to the invention, the concentration of the galactomannan polymer in the flooding fluid is in the range between 0.5 g/l to 5 g/l. In a preferred embodiment, the concentration is in the between 0.7 g/l to 3 g/l.

The component of the flooding fluid that is present in the greatest concentration is water. Typically, water will be a major amount by weight of the fluid. Water is typically present in an amount by weight of about 50% or more and more typically of about 80% or more by weight of the fluid. The water can be from any source so long as the source contains no contaminants that are chemically or physically incompatible with the other components of the fluid (e.g., by causing undesirable precipitation). The water does not need to be potable and may be brackish and contain salts of such metals as sodium, potassium, calcium, zinc, magnesium, etc or other materials typical of sources of water found in/or near oil fields.

The flooding fluid may optionally contain a gas such as air, nitrogen or carbon dioxide to provide an energized fluid or foam. The flooding fluid may contain all classical chemicals found in such fluids, like anticorrosion additives, oxygen scavengers, scale or other type deposit inhibitors, salts, soda or other base, acids, surfactants, . . . .

The method of the present invention may optionally be preceded by a hydraulic fracturing step. In hydraulic fracturing, a fracturing fluid, such as water, is injected through a well and against the face of the formation at a pressure and flow rate sufficient to overcome the overburden pressure of the formation and initiate and/or extend a fracture(s) into the formation.

The invention having been generally described, the following examples given as particular embodiments of the invention and to demonstrate the practice and the advantages thereof. It is understood that the examples are given by way of illustration and are not intended to limit the specification.

Example 1

Example of a Synthesis of Sulfonated Guars According to the Invention

The grafting of the sulfonation agent onto the Guar polysaccharide is achieved using processes known in the polysaccharide industry. Among the possible pathways, the grafting of sulfonation agent onto hydroxypropyl Guar (HP Guar) can be done using a water/alcohol dispersion process.

For example, the sulfonated hydroxypropyl Guar-sodium vinyl sulfonate (HP Guar–SVS/DS=1.42) which has a degree of substitution (DS) equal to 1.42 is prepared as follows:

58 g of Jaguar® HP105 (lot #H0808487K, Rhodia Inc.) are suspended in 450 ml of isopropanol in a glass reactor equipped with an overhead stirring unit, a temperature probe, a condenser and an addition funnel. Then, the addition funnel is used to add, in a drop-wise manner:

52 g of a sodium hydroxide aqueous solution (50%)
178.6 g of a SVS concentrated solution.

The reaction medium is then heated to 60 C; this temperature is maintained during 4 hours and then the reactor is cooled down to room temperature. The resulting slurry is filtered using a ceramic filter. The paste thus obtained is redispersed in 500 ml made of isopropanol/water 80/20 vol/vol. Acetic acid is then added to that suspension to neutralise the product. This slurry is then filtered; the resulting paste is washed twice with a 500 ml of isopropanol/water 80/20 vol/vol and finally the paste is dried at room temperature and grinded.

The SVS concentrated solution is extemporaneously prepared from a SVS solution 25% provided by Proviron) heated in a rotative evaporator to obtain a final concentration equal to 44.9%.

Jaguar® HP 105 has in average 0.6 hydroxypropyl groups per saccharide unit.

Characteristic of the synthesized compound have been investigated. The degree of substitution is measured by quantitative $^{13}$C NMR with the following protocol:

High molecular weight Guars and Guar derivatives produce viscous solutions when dissolved in water. In order to reduce the viscosity of the solution, the polysaccharide chains are cleaved with trifluoroacetic acid (TFA). TFA is chosen because it does not interfere with the Guar spectrum and it acts as an internal reference.

The typical process for Guar cleavage is as follows: 1 gram of Guar is dispersed into 4 ml of 1:1 $D_2O$:TFA solution in a reaction vial. Then the vial is heated at 90° C. for 2 hours at least; alternatively, one can also cleave the polymer chains using a microwave at 80° C. during 1 hour approximately. The sample is then filtered and placed into a 10 mm NMR tube for quantitative carbon analysis.

Figure 2:
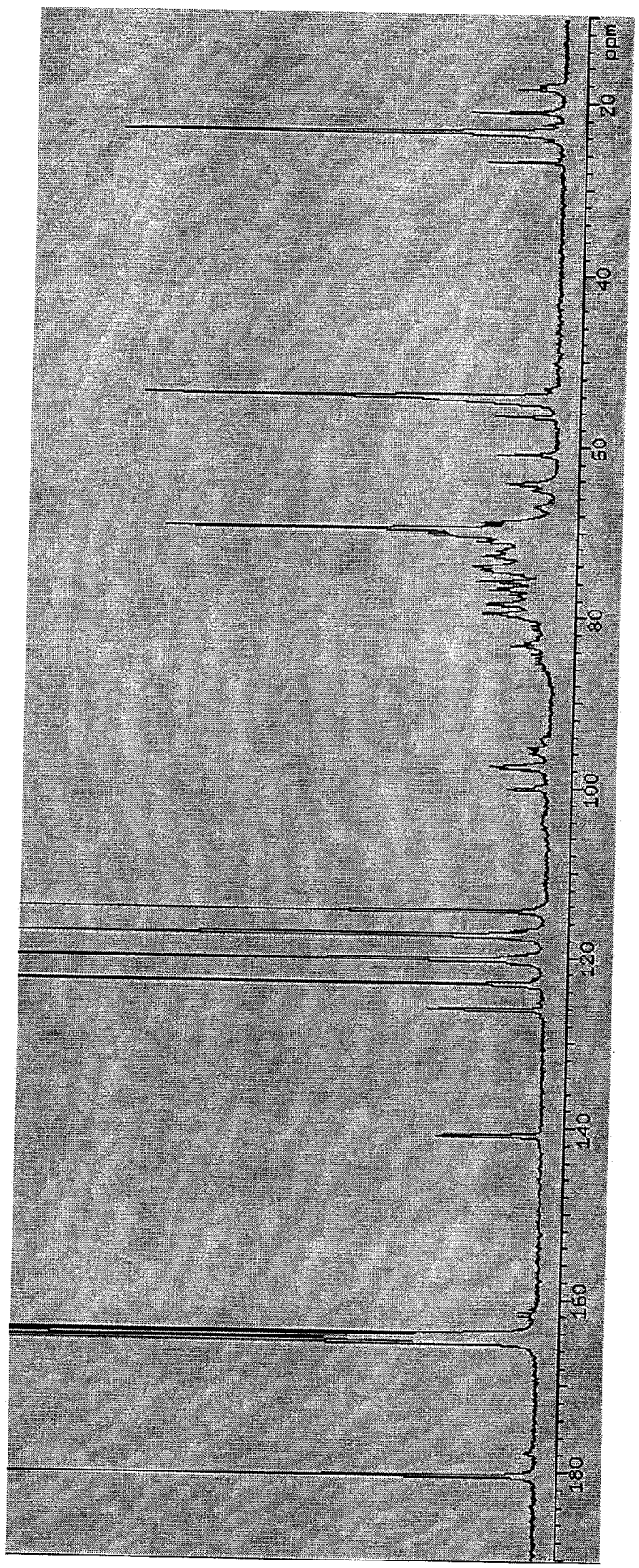
FIG. 2 is an example of $^{13}$C NMR spectrum obtained for the HP Guar-SVS/DS=1.42 in D$_2$O/TFA using a Varian Unitylnova 400 MHz.

The optimal pulse width (pw) and the relaxation time (dl) are measured first; then the quantitative $^{13}$C is performed. Results obtained with a Varian Unitylnova 400 MHz are shown in FIG. 2 The DS is calculated from the intensity of carbons from the sulfonated grafts and the intensity of the anomeric carbons, both measured by $^{13}$C NMR. One of the two carbon belonging to the sulfonated grafts usually appears around 50-54 ppm while the anomeric carbons usually appear around 95-105 ppm. The DS is obtained dividing the intensity of the peak belonging to the sulfonated grafts by the intensity of the anomeric carbon.

The average molecular weights are measured by MALLS (Multi Angle Laser Light Scattering) coupled with a GPC column (Gel Permeation Chromatography). The protocol is explained below:

Column: Pheneomenex Polysep-GFC P5000 and P4000 in series
Mobile Phase: 100 mM $NaNO_3$, 100 mM LiCl
Flow Rate: 0.6 ml/min
Detectors: Agilent 1100 RI detector, Wyatt MiniDAWN MALS
Injected Volume: 200 μl
Temperature: ambient
Run time: 50 minutes The samples are dissolved in the mobile phase at 0.1% by weight and filtered through 0.45 μm PVDF filters prior to injection. The MALLS detector is standardized using a 32,500 Da Polyethylene oxide standard.

Figure 3:
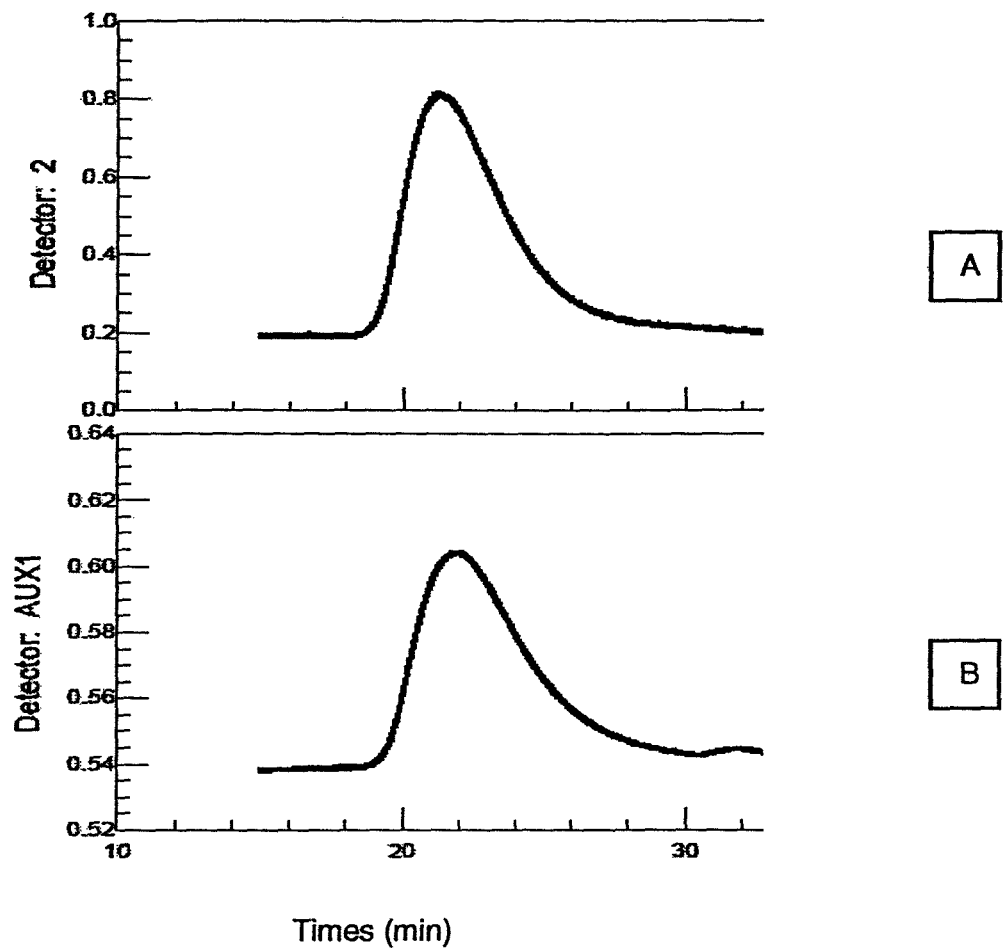
FIG. 3 is an example of MALLS/SEC chromatogram obtained for the HP Guar-SVS/DS=1.42. Part A of FIG. 3 represents Light scattering (Y-axis), measured as a function of elution time (X-axis); Part B of FIG. 3 shows Refractive index (Y-axis), measured as a function of elution time (X-axis).

Results for the HP Guar-SVS/DS=1.42 are given in FIG. 3.

Part A of FIG. 3 represents the signal from the Light Scattering detector, while part B of FIG. 3 displays the signal from the Refractive index detector. The x axe shows the elution time, that corresponds to the time it takes polymer chains to exit the Size Exclusion Chromatography column.

Example 2

Study of Injectivity Properties

The study of the injectivity properties of the galactomannan polymers according to the invention is made by measuring the pressure drop induced by the flow (constant flow rate) through a porous membrane (5 μm pores) as a function of the injected volume. The injectivity is directly correlated to the pressure drop increase as a plugging of the porous media leads to a strong increase of the pressure drop. The higher the plugging of the porous medium, the higher the pressure increase.

Figure 4:
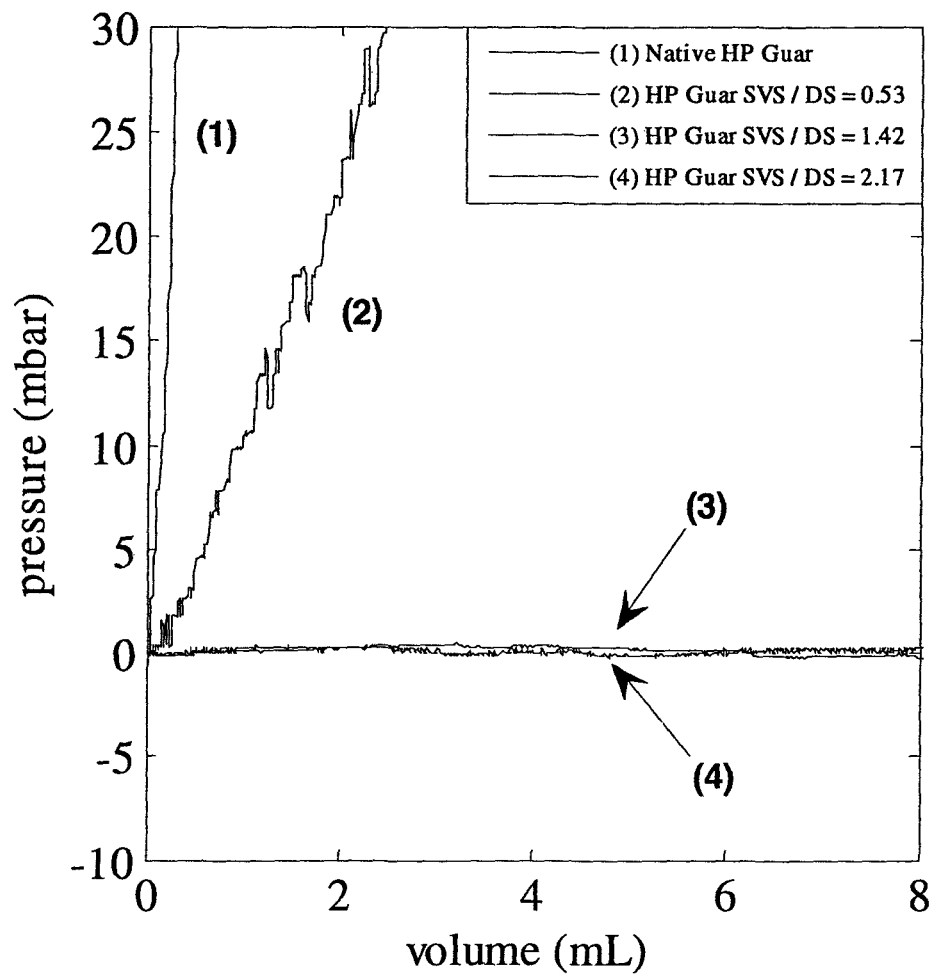
FIG. 4 outlines the injectivity properties of the galactomannan polymers according to the invention. It displays the pressure (Y-axis, in mbar) induced by the flow of different galactomannan polymers (X-axis, volume injected in ml). Three galactomannan polymers having different degree of substitution were tested against a non-sulfonated hydroxypropyl Guar (HP Guar).

Results are presented in the FIG. 4. For HP Guar (curve n° 1), the strong pressure increase reveals a strong plugging of the membrane (i.e. poor injectivity). With sulfonated HP Guar-SVS/DS=0.53 (curve n° 2), lower pressure increase shows that injectivity is strongly improved. For higher DS values (curves n° 3 and n° 4), the pressure remains constant revealing no plugging of the porous medium.

These results show that the injectivity increases with the substitution degree (DS). This injectivity improvement is observed for degree of substitution (DS) values larger than 0.25 and preferentially larger than 1 and more preferentially larger than 1.5. This improvement depends neither on the substrate (native Guar or previously derivatized Guars) which is derivatized nor the monomer used; SVS being the preferred monomer.

The injectivity of the sulfonated samples obtained with this technique is comparable to the injectivity of high molecular weight polyacrylamides considered as the benchmark in EOR applications.

Example 3

Study of Static Adsorption on Clay

A series of experiments are performed to evaluate the adsorption level of the different studied polymers. To do so, the well known depletion method is used. It consists of mixing polymer solutions with natural clay suspensions and measuring the resulting adsorption. The test procedure is detailed below:

The clay suspension is prepared by adding a precise amount of Speswhite™ (Imerys S.A) in 10 ml of sea water (pH=7), inside a Nalgene® centrifuge tube (ref 3110-9500 from Nalgene). These PPCO (ethylene-propylene block copolymers) tubes have been chosen for their excellent resistance to solvents and their absence of interactions with clay. The sample is mixed for 15 minutes at 700 rpm using a magnetic stirrer. An equivalent volume of polymer solution is introduced into the tube. To ensure a good contact between mineral surfaces and polymer chains, the mixture is shaken for 24 hours, at 700 rpm. All these steps take place at ambient temperature. The clay is then separated from the solution by centrifugation (13 000 rpm for 1 hour). The amount of adsorbed polymer is determined from the difference between the polymer concentration in the supernatant before and after the contact. It is measured using the total organic carbon analyzer (Shimadzu TOC 5050).

A classical hydrolyzed polyacrylamide FLOPAAM 3630S (VE4327, SNF Floerger) (named HPAM or HPAM 3630S in the following description) is used for sake comparison.

Tests are performed in fixed ionic strength with a synthetic sea water containing NaCl: 24.79 g/l,
$MgCl_2$, 6 $H_2O$: 11.79 g/l,
KCl: 0.8 g/l,
$CaCl_2$, 2 $H_2O$: 1.6 g/l,
$NaN_3$ (bactericide): 0.4 g/l.

The brine is filtered through Millipore™ 0.22 μm membranes, and then used as solvent for Guar polymers as well as for the HPAM.

The solid/liquid (S/L) ratio is defined as the amount of clay expressed in mg per 100 ml of solution. Its value has a great impact on the experimental results:

When too low, adsorption might be difficult to determine because of a lack of sensitivity (10% at least of polymer has to be adsorbed), When too high, clay particles might flocculate and render surfaces inaccessible to polymer chains.

In order to both guarantee a good accuracy and limit kaolin aggregation, the ratio S/L is set at 1%.

Figure 5:
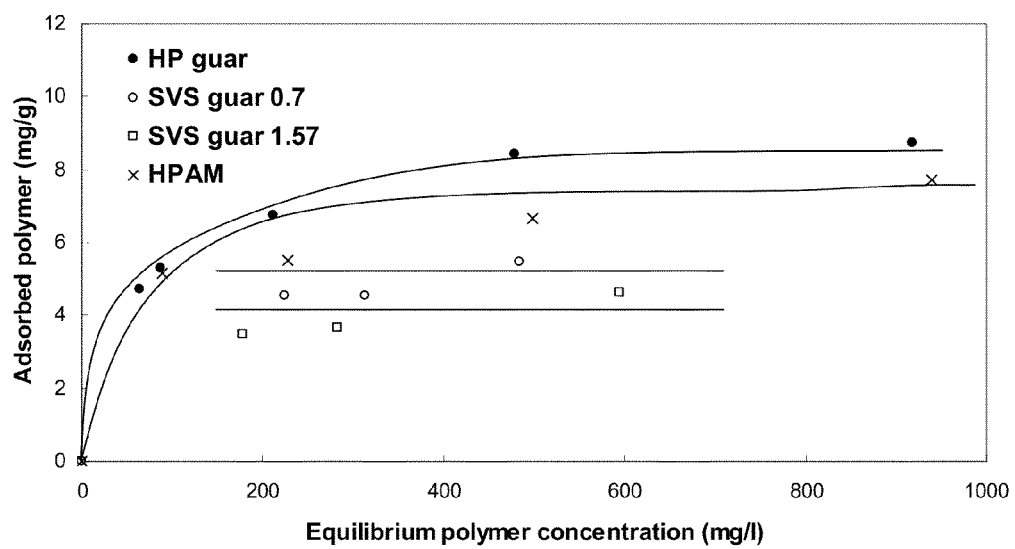
FIG. 5 displays the adsorption isotherms of the HP Guar according to the invention with Speswhite™ in synthetic sea water. HP Guar and an acrylamide polymer were used for comparison. Y-axis represents the adsorbed polymer in mg/g and X-axis the equilibrium polymer concentration in mg/l. The black circles represent the HP Guar; the open circles represent the HP Guar-SVS/DS=0.7; the open squares represent Guar-SVS/DS=1.57 and the crosses represent the HPAM.

Results with the HP Guar (black circle), with the HP Guar-SVS/DS=0.7 (open circle), with HP Guar-SVS/DS=1.57 (open square) and HPAM (cross) are presented in FIG. 5

The experiments revealed that the presence of a few sulfonate groups is very efficient to significantly reduce the adsorption of HP Guars. HPAM will present an isotherm plateau value of 7 mg/g, close to that of the HP Guar.

Example 4

Study of the Resistance to Mechanical Degradation

Additional experiments are conducted in order to investigate the resistance to mechanical degradation of the galactomannan polymers according to the invention.

During polymer flood processes, displacing fluids are submitted to high shear and elongation flows, particularly in the initial injection devices, nozzles, valves and pumps. As a result, macromolecules can degrade and loose their thickening capacity. Therefore, the evaluation of a suitable polymer includes its ability to sustain mechanical stresses.

A capillary shear test apparatus is used to test the mechanical resistance of the HP Guar-SVS/DS=1.57 solutions. It follows the recommendations RP63 formulated by the American Petroleum Institute for the evaluation of polymers used in enhanced oil recovery operations (First edition, Jun. 1, 1990, Reaffirmed 2000). It allows to push the sample through a capillary tube at different pressure level ranging from 0.7 to 7 bars (1 bar=$10^5$ Pa). The resulting shear degradation of the polymer solution is assessed by measuring its viscosity at 25° C. before and after the shear test, on a standard viscometer (Contraves LS 30). The concentration of the HP Guar-SVS and of the HPAM is equal to 1.5 g/mol.

Figure 6:
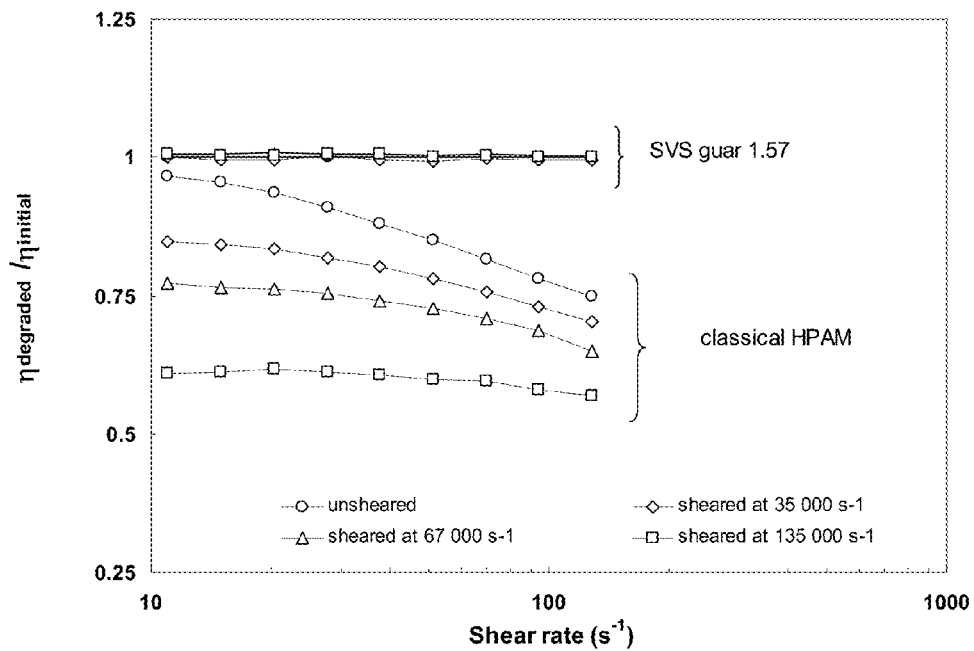
FIG. 6 displays the mechanical degradation of a HP Guar-SVS/DS=1.57 and HPASM sample at 25° C. The relative viscosity (Y-axis) is measured at different increasing shear rates (X-axis, in s$^{-1}$). The circles represent the unsheared HP Guar-SVS/DS=1.57; the triangles represent the HP Guar-SVS/DS=1.57 sheared at 67 000 5$^{-1}$; the diamond-shaped represent the HP Guar-SVS/DS=1.57 sheared at 35 000 s$^{-1}$ and the squares represent the HP Guar-SVS/DS=1.57 shared at 135 000 s$^{-1}$.

All the flow curves (FIG. 6) obtained on the sulfonated Guar solutions (HP Guar-SVS/DS=1.57) are perfectly superimposed, showing the absence of mechanical degradation. The viscosity of the sulfonated Guar solution is the same at the beginning and at the end of the experiment. On the contrary, the classical HPAM reveals an important decrease in viscosity resulting from chain scissions.

Theses results demonstrate that the sulfonated polysaccharides according to the invention are much more resistant to the mechanical degradation that the conventional HPAM 3630S used in flooding process. It seems that there is no cutting of the sulfonated polymer chains and no reduction of the molecular mass.

Example 5

Study of Injection in Porous Media

Two HP Guar polymers are selected for an evaluation in porous media. The first polymer is a standard HP Guar. The second polymer is a sulfonated HP Guar (HP Guar-SVS) having a DS of 1.57. These polymers are compared to the industrial FLOPAAM 3630S (named HPAM or HPAM 3630S in the following description) manufactured by SNF Floerger.

Synthetic seawater is used as solvent to prepare polymer solutions. The composition of the synthetic seawater is the same as this described below. The brine is filtered through Millipore™ MF 0.22 μm membranes, then degassed under vacuum and kept under helium cap to prevent bubble formation in the porous medium during core flow tests. The coreflood tests are carried out at 50° C. The core used is a Clashach natural sandstone. It is notable for its quartz overgrowths, producing well-cemented sandstones with porosities of 12% to 18% and permeability ranging from 0.2 Darcy to 1.5 Darcy (1 Darcy=$9.87.10^{-13}$ m$^2$). Clashach mineralogy is 95% quartz and a low fraction of clay (<1% illite). Because of the low clay mineral content, the Clashach sample is classified as fairly clean sandstone. In our experiments, cores were chosen referring to an average permeability to brine close to 0.8 Darcy and porosity approximately 17%.

The outcrop rocks consisted of homogenous core samples which are cut from a single block of quarried sandstone. Core plugs are drilled then dried and mounted in a Viton sleeve (thickness=5 mm), then set in a Hassler cell. Core plugs have a diameter of 4 cm and a length between 6 and 7 cm. A nitrogen overburden pressure of 3000 kPa is maintained on the sleeve for lateral core tightness. The pore pressure is fixed at 2 bars using a back pressure valve at the outlet of the cell. The core is flushed by several pore volumes of brine (seawater) and permeability is determined at different flow rates. The core-holder is set in a thermostatic oven regulated at 50° C. A titanium capillary is placed in-line in order to determine the bulk viscosities of the polymer solutions both upstream the core and downstream the core (by using a by-pass) thus enabling adsorption measurement by material balance. Constant flow rate pumps (Pharmacia® P500, Labotron, Quizix) are used to inject either water or polymer solutions. Very precise and sensitive differential transducers (15, 75, 300, 900 mbars and 18 bars full scale with a precision of 0.2%) enable a monitoring of Mobility or Permeability Reduction in the cores, as well as polymer viscosity by pressure drops measurement through the on-line capillary. A fraction collector is placed at the outlet of the set-up, downstream the constant pressure valve, to measure complementary viscosity (Low shear).

Below general sequences of single-phase flow conditions are described for HPAM, HP Guar and for sulfonated HP Guar (HP Guar-SVS/DS=1.57) respectively.

HPAM

1. Preliminary injection of several pore volumes of brine at 4 cm$^3$/h,

2. Seawater injection at various flow rates and determination of the absolute permeability kw, 3. First front polymer injection (Concentration C=0.4 g/l), at 4 cm$^3$/h corresponding to low shear rates (4.5 s$^{-1}$) and determination of the Mobility Reduction Rm, 4. Seawater injection at 4 cm$^3$/h for removal of the non-adsorbed molecules, 5. Second front polymer injection (C=0.4 g/l), at 4 cm$^3$/h. The difference between first and second polymer fronts gives a measurement of polymer adsorption in the core, 6. Seawater injection at various flow rates leading to the determination of the Permeability Reduction Rk as a function of maximum shear rate in pore throats, 7. Third polymer injection (C=1.5 g/l) at 4 cm$^3$/h and determination of the Mobility Reduction Rm, 4. Injection of successive polymer slugs (HPAM) at same concentration (C=1.5 g/l) and at increasing flow rates (up to 50 cm$^3$/h). Determination of the Mobility Reduction Rm, 5. Seawater injection at 4 cm$^3$/h for removal of the non-adsorbed molecules, then injection at various flow rates leading to the determination of the Permeability Reduction Rk.

HP Guar

1. Preliminary injection of several pore volumes of brine at 2 cm$^3$/h,
2. Seawater injection at various flow rates and determination of the absolute permeability kw,
3. First polymer injection (Concentration C=1.5 g/l) at 4 cm$^3$/h corresponding to low shear rates (5.7 s$^{-1}$) and determination of the Mobility Reduction Rm,
4. Injection of successive polymer slugs at same concentration (C=1.5 g/l) and at increasing flow rates (10 cm$^3$/h and 20 cm$^3$/h). Determination of the Mobility Reduction Rm,
5. Seawater injection at 4 cm$^3$/h for removal of the non-adsorbed molecules, then injection at various flow rates leading to the determination of the Permeability Reduction Rk, Sulfonated Guar (HP Guar–SVS/DS=1.57)

1. Preliminary injection of several pore volumes of brine at 2 cm$^3$/h,
2. Seawater injection at various flow rates and determination of the absolute permeability kw,
3. First front polymer injection (C=1 g/l), at 4 cm$^3$/h corresponding to low shear rates (6.2 s$^{-1}$) and determination of the Mobility Reduction Rm,
4. Seawater injection at 4 cm$^3$/h for removal of the non-adsorbed molecules,
5. Second front polymer injection (C=1 g/l), at 4 cm$^3$/h. The difference between first and second polymer fronts gives a measurement of polymer adsorption in the core,
6. Seawater injection at various flow rates leading to the determination of the Permeability Reduction Rk as a function of maximum shear rate in pore throats,
7. Third front polymer injection at 2 g/l, at 4 cm$^3$/h,
8. Seawater injection at various flow rates.

Adsorption measurements require the injection of relatively diluted polymer solutions in order to have a good precision between the two fronts (step 3 and 5).

The Mobility Reduction Rm measures the apparent viscosity of the polymer solution flowing in the medium. It takes into account both bulk chemical system viscosity and the Permeability Reduction due to adsorption. It is related to the pressure drop using the equation:

$$Rm = \Delta P_{polymer} / \Delta P_{brine} \quad (1)$$

$\Delta P_{polymer}$ is the pressure drop during polymer flow through the core, and $\Delta P_{brine}$ is the pressure drop during brine flow before chemical system injection.

$\Delta P_{polymer}$ and $\Delta P_{brine}$ are determined at the same flow rate. Rm is also called Resistance Factor RF.

Classically, during an experiment, one determines the evolution of the Mobility Reduction (Rm) according to the injected volume (V). After several pore volumes injected, the performances of the polymer, in term of injectivity, are evaluated by calculating the slope of the curve Rm versus V (dRm/dV).

Obtaining a stationary regime (dRm/dV~0) mean's a very good injectivity and a good in-depth propagation of the polymer. The higher the dRm/dV value, worse the injectivity and the quality of the propagation are.

The Permeability Reduction Rk$_w$ takes into account the effect of adsorption/retention or eventually plugging in the core. It is equal to:

$$Rk_w = \Delta P_{brine\ after\ polymer} / \Delta P_{brine\ before\ polymer} \quad (2)$$

Rk$_w$ is also called Residual Resistance Factor RRF$_w$.

Results for HPAM Test:

The coreflood experiment is carried out using the HPAM solution filtered through Nylon 10 µm as described above. Successive injections of polymer and brine slugs give Mobility and Permeability Reduction values versus polymer concentration (0.4 g/l and 1.5 g/l) in a Clashach core (permeability kw=1258 mD).

The first front of HPAM solution (C=0.4 g/l) is injected at 4 cm$^3$/h corresponding to a shear rate of 4.5 s$^{-1}$ and a velocity of 0.44 m/d (m/d means 1 meter/day). Relative viscosity of the solution is $\eta_r$=2.4. Mobility Reduction Rm$_1$ increases up to around 4.1 (after 1.5 PV injected), effluent viscosity reaching 100% of injected solution viscosity after approximately 1.8 PV (27.8 cm$^3$). Free molecules are swept by brine at 4 cm$^3$/h and Permeability Reduction to water is determined at a flow rate of 4 cm$^3$/h (shear rate=4.5 sec$^{-1}$) with Rk=1.6.

The second front of HPAM solution is injected (6.6 PV) at the same concentration (C=0.4 g/l) and at the same flow rate (4 cm$^3$/h). Mobility Reduction increases up to around 4.15 (after 1.0 PV injected) and then remains approximately constant (dRm/dV~0). Effluent viscosity reaching 100% of injected solution viscosity after less than 1.6 PV injected (24.8 cm$^3$). Free molecules are swept by brine at 4 cm$^3$/h and Permeability Reduction Rk$_2$ is determined increasing flow rates from 4 cm$^3$/h (shear rate=4.5 s$^{-1}$, Rk$_2$=1.6) to 50 cm$^3$/h (shear rate=56.6 s$^{-1}$, Rk$_2$=1.85) and shows a slight shear thickening behaviour.

The adsorption determined by material balance from the recording of the effluent concentration as a function of pore volumes injected gives 10 µg/g.

A third front of HPAM solution is injected at C=1.5 g/l and at the same flow rate (4 cm$^3$/h).

Figure 7:
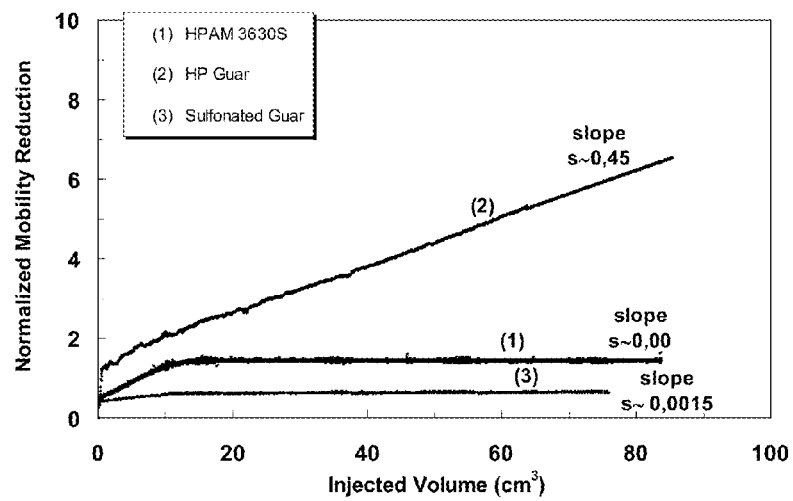
FIG. 7 outlines the comparative study of injectivity in a porous media between HP Guar (curve 2), HPAM 3630S (curve 1), and the HP Guar-SVS/DS=1.57 (curve 3). The Mobility Reduction has been measured as function of injected volume of sample (X-axis, cm$^3$).

Mobility Reduction Rm$_1$ increased up to around 17.7 and then remained constant (dRm/dV~0) along the 8 PV (PV=Pore Volume) injected corresponding to 124 cm$^3$ injected (FIG. 7).

Effluent viscosity reaching 100% of injected solution viscosity after less than 2 PV injected.

The results of the injection of the HPAM are presented in the table below.

Results for HP Guar Test:

The coreflood experiment is carried out using the HP Guar solution filtered through Nylon 10 µm as described above. When HP Guar is injected at 1.5 g/l in a Clashach sandstone (permeability kw=872 mD), Mobility Reduction Rm$_1$ increases up to around 6.5 and then a linear increase is observed (dRm/dV=0.45) along the 10 PV injected corresponding to 133 cm$^3$ injected (FIG. 7). Despite this relative poor injectivity of the HP Guar, effluent concentration stabilizes at a value close to 97%, referring to the mother solution. The fact that Mobility Reduction value is high and does not reach equilibrium could be probably due to the retention of cellulose (microfibrils) or hemicellulose without any effect detected on effluent viscosity measurements. The results of the injection of the HP Guar are presented in next table.

Results for Sulfonated HP Guar Test:

The coreflood experiment is carried out using the HP Guar–SVS solution after first filtration through 12-15 µm Durieux filters then a second ultrafiltration through a 20,000 molecular weight cut off membrane, as described above. Successive injections of polymer and brine slugs give Mobility and Permeability Reduction values versus polymer concentration (1 g/l and 2 g/l) in a Clashach core (permeability kw=729 mD).

The first front of HP Guar–SVS solution (C=1 g/l) is injected at 4 cm$^3$/h corresponding to a shear rate of 6.2 s$^{-1}$ and a velocity of 0.48 m/d. Relative viscosity of the solution is low for this concentration ($\eta_r$=1.67). Mobility Reduction $Rm_1$ increases up to around 1.58 (after 1.2 PV injected), effluent viscosity reaching 100% of injected solution viscosity after approximately 2 PV (26.6 cm³). Free molecules are swept by brine at 4 cm³/h and Permeability Reduction to water is determined at a flow rate of 4 cm³/h (shear rate=6.2 sec⁻¹) with Rk=1.03.

The second front of HP Guar–SVS solution is injected (6 PV) at the same concentration (C=1 g/l) and at the same flow rate (4 cm³/h). Mobility Reduction increases up to around 1.78 (after 1.2 PV injected) and then remains approximately constant (dRm/dV=0.0015). Effluent viscosity reaching 100% of injected solution viscosity after less than 2 PV injected (26.6 cm³). Free molecules are swept by brine at 4 cm³/h and Permeability Reduction $Rk_2$ is determined, as for $Rm_2$, increasing flow rates from 4 cm³/h (shear rate=6.2 s⁻¹, $Rk_2$=1.12) to 50 cm³/h (shear rate=77.5 s⁻¹, $Rk_2$=1.12).

The adsorption determined by material balance from the recording of the effluent concentration as a function of pore volumes injected gives 4 μg/g. A third front of HP Guar–SVS solution is injected at C=2 g/l and at the same flow rate (4 cm³/h). Mobility Reduction increases up to around 3 (after ~2 PV injected) and then remains approximately constant (dRm/dV~0) all during the injection (13.1 PV). Effluent viscosity reaching 100% of injected solution viscosity after less than 2 PV injected.

Mobility Reduction $Rm_3$ is also determined at increasing flow rates from 4 cm³/h (shear rate=6.2 sec⁻¹, $Rm_3$=3.2) to 50 cm³/h (shear rate=77.5 sec⁻¹, $Rm_3$=2.9). A slight shear thinning effect is observed. Free molecules are swept by brine at 4 cm³/h and Permeability Reduction $Rk_3$ is determined, as for $Rm_3$, increasing flow rates from 4 cm³/h (shear rate=6.2 sec⁻¹, $Rk_3$=1.1) to 50 cm³/h (shear rate=77.5 sec⁻¹, $Rk_3$=1.12).

Comparative results of mobility reduction (FIG. 7) show the good injectivity properties of the sulfonated HP Guar (very low slope s=0.0015; curve 3) compared to HP Guar (s=0.45; curve 2). Injectivity properties of the HP Guar–SVS/DS=1.57 are comparable than those of the synthetic copolymers HPAM (s~0; curve 1).

Summary of coreflood results are shown on Table 2. They confirm the very good properties in terms of injectivity and low dynamic adsorption of the HP Guar–SVS/DS=1.57 (2.8 μg/g compared to 10 μg/g for HPAM and 17 μg/g for HP Guar).

TABLE 2

Comparisons between HP Guar, HPAM, HP Guar-SVS/DS = 1.57.

| Polymer | Concentration of the polymer (mg/l) | Filtration | $k_{Sw=1}$ (μm²) | PV at Sw = 1 (cm³) | dRm/dV | Adsorption (μg/g) |
|---|---|---|---|---|---|---|
| FLOAAPAM | 400 | Nylon 10 μm | 1.25 | 15.5 | ~0 | 10 |
| 3630S (HPAM) | 1500 | | | | ~0 | — |
| HP Guar | 1500 | Nylon 10 μm | 0.87 | 13.3 | 0.45 | — |
| HP Guar-SVS/ DS = 1.57 | 666 1333 | Durieux 12-15 μm | 0.73 | 13.1 | 0.0015 ~0 | 2.8 |

The invention claimed is:

1. An enhancing oil recovery method comprising the following steps:
   (a) injecting into a subterranean oil formation an aqueous flooding fluid through one or more injection wells,
   (b) displacing the aqueous flooding fluid into the formation towards one or more production wells,
   (c) recovering the oil from one or more producing wells, said aqueous flooding fluid comprising at least one injecting galactomannan polymer substituted by at least one sulfonation agent, wherein the substitution degree of the galactomannan polymer is in the range of 0.25-2.5.

2. The enhancing oil recovery method according claim 1, wherein the galactomannan polymer is the native Guar.

3. The enhancing oil recovery method according claim 1, wherein the galactomannan polymer is a derivatized galactomannan polymer selected from the group comprising hydroxypropyl Guar (HP Guar), carboxymethyl Guar (CM Guar), carboxymethyl hydroxypropyl Guar (CMHP Guar), hydroxyethyl Guar (HE Guar), carboxymethyl hydroxyethyl Guar (CMHE Guar), hydrophobically-modified Guar (HM Guar), hydrophobically-modified carboxymethyl Guar (HMCM Guar) and hydrophobically-modified hydroxyethyl Guar (HMHE Guar), cationic hydrophobically modified hydroxypropyl Guar (cationic HMHP Guar), hydrophobically modified carboxymethylhydroxypropyl Guar (HMCMHP Guar) and hydrophobically modified cationic Guar (HM cationic Guar).

4. The enhancing oil recovery method according claim 1, wherein the sulfonation agent is selected in the group comprising 2-acrylamido-2-methyl propane sulfonic acid (AMPS), sodium vinyl sulfonate (SVS), sodium (meth)allyl sulfonate, (meth)allyloxybenzene sulfonic acid, sodium 1-allyloxy 2 hydroxy propyl sulfonate, sodium chlorohydroxypropanesulfonate (CHPSNa), sodium bisulfite, 1,3-propylsultone, 1,4-butylsultone, sodium styrene sulfonate (SSS).

5. The enhancing oil recovery method according claim 1, wherein the galactomannan polymer has a molecular weight in the range 100 000 g/mol to 20 000 000 g/mol.

6. The enhancing oil recovery method according to claim 1, wherein the substitution degree of the galactomannan polymer is in range of 0.5-2.2.

7. The enhancing oil recovery method according to claim 1, wherein the concentration of the galactomannan polymer is in range between 0.5 g/l to 5 g/l.

8. An aqueous flooding fluid for enhancing an oil recovery method comprising at least one injecting galactomannan polymer substituted by at least one sulfonation agent, substitution degree of the galactomannan polymer is in the range of 0.25-2.5.

9. The aqueous flooding fluid according claim 8, wherein the injecting galactomannan polymer is the native Guar.

10. The aqueous flooding fluid according claim 8, wherein the galactomannan polymer is a derivatized galactomannan polymer selected from the group comprising hydroxypropyl Guar (HP Guar), carboxymethyl Guar (CM Guar), carboxymethyl hydroxypropyl Guar (CMHP Guar), hydroxyethyl Guar (HE Guar), carboxymethyl hydroxyethyl Guar (CMHE Guar), hydrophobically-modified Guar (HM Guar), hydrophobically-modified carboxymethyl Guar (HMCM Guar) and hydrophobically-modified hydroxyethyl Guar (HMHE Guar), cationic hydrophobically modified hydroxypropyl Guar (cationic HMHP Guar), hydrophobically modified carboxymethylhydroxypropyl Guar (HMCMHP Guar) and hydrophobically modified cationic Guar (HM cationic Guar).

11. The aqueous flooding fluid according claim 8, wherein the sulfonation agent is selected in the group comprising 2-acrylamido-2-methyl propane sulfonic acid (AMPS), sodium vinyl sulfonate (SVS), sodium (meth)allyl sulfonate, (meth)allyloxybenzene sulfonic acid, sodium 1-allyloxy 2 hydroxy propyl sulfonate, sodium chlorohydroxypropanesulfonate (CHPSNa), sodium bisulfite, 1,3-propylsultone, 1,4-butylsultone, sodium styrene sulfonate (SSS).

12. The aqueous flooding fluid according claim 8, wherein the galactomannan polymer has a molecular weight in the range 100 000 g/mol to 20 000 000 g/mol.

13. The aqueous flooding fluid according to claim 8, wherein the substitution degree of the galactomannan polymer is in range of 0.5-2.2.

14. The aqueous flooding fluid according to claim 8, wherein the concentration of the galactomannan polymer is in range between 0.5 g/l to 5 g/l.

* * * * *